United States Patent [19]
Cline et al.

[11] Patent Number: 4,755,251
[45] Date of Patent: Jul. 5, 1988

[54] BONDING METHOD EMPLOYING PRIMER FOR FIBERGLASS REINFORCED POLYESTER

[75] Inventors: Richard L. Cline, Ashland; Scott V. Nolletti, Wooster; Thomas G. Rabito, Ashland; Daniel A. Chung, Dublin, all of Ohio

[73] Assignee: Ashland Oil, Inc., Ashland, Ky.

[21] Appl. No.: 12,536

[22] Filed: Feb. 9, 1987

[51] Int. Cl.$^4$ .................................................. C09J 5/04
[52] U.S. Cl. ..................................... 156/315; 156/314; 156/331.4; 156/307.3; 428/302; 428/414; 523/456; 523/461; 523/462
[58] Field of Search ...................... 156/314, 315, 331.4, 156/307.3; 428/302, 414; 523/456, 462, 461

[56] References Cited

U.S. PATENT DOCUMENTS

| 3,200,031 | 8/1965 | Rittenhouse | 428/414 |
| 3,505,269 | 4/1970 | Jeffery et al. | 523/461 |
| 3,647,513 | 3/1972 | Jackson | 117/47 A |
| 3,813,351 | 5/1974 | Thomson | 523/461 |
| 4,004,050 | 1/1977 | Rabito | 427/302 |
| 4,166,058 | 8/1979 | Svigelj | 260/38 |
| 4,500,606 | 2/1985 | Rabito | 428/480 |

FOREIGN PATENT DOCUMENTS 49-47436  5/1974  Japan ................................. 523/456

OTHER PUBLICATIONS

EPON Resin 828 Data Sheet, Shell Chemical Co., sc: 60-146R.
Silane Y-9492 Information, Union Carbide.
FREON Solvent Data Bulletin No. FST-1, DuPont.

Primary Examiner—John J. Gallagher
Attorney, Agent, or Firm—Mary E. Picken

[57] ABSTRACT

A primer composition for use on fiberglass reinforced polyester substrates combining an ether type low molecular weight epoxy resin, an amino functional silane and halogenated hydrocarbon solvent.

5 Claims, No Drawings

BONDING METHOD EMPLOYING PRIMER FOR FIBERGLASS REINFORCED POLYESTER

This invention relates to primers used on fiberglass reinforced polyester (FRP) substrates before the FRP parts are attached, using urethane adhesives, to other primed FRP parts.

BACKGROUND OF THE INVENTION

Fiberglass reinforced polyester (FRP) parts are widely used in industry in general and in the automobile industry in particular. These parts are attached to other FRP parts or to metal or plastic parts using urethane adhesives. In order to obtain a satisfactory bond between FRP parts or between FRP and metal parts it is necessary to clean and pre-treat or prime the FRP surface before applying the adhesive. Among the FRP treatments commonly used are shot blasting, washing or sanding.

A number of different primers have been developed for use with FRP substrates. Among these are the primers of U.S. Pat. No. 3,647,513 and U.S. Pat. No. 4,004,050. These primers may contain organic polyisocyanates and/or methylene chloride. In recent years it has become desirable, for a number of reasons, to replace such primers with new primers containing ingredients which are more environmentally acceptable.

It is therefore an object of this invention to provide a primer for use with fiberglass reinforced polyester which will give strong bonds when urethane adhesives are used, but which contain neither isocyanates nor methylene chloride.

SUMMARY OF THE INVENTION

In one embodiment this invention is a primer composition for use on fiberglass reinforced polyester substrates which enhances the adhesion of urethane adhesives to said substrates comprising an ether type epoxy resin, an amino functional silane, and an organic solvent.

In another embodiment this invention is a process for adhering a first fiberglass reinforced polyester substrate to a second substrate selected from the group consisting of fiberglass reinforced polyester, metal or plastic, comprising the steps of priming said first polyester substrate with a primer comprising an ether type epoxy resin, an amino functional silane, and an organic solvent, applying urethane adhesive, affixing said second substrate, and curing said adhered substrates for 30 minutes at 150° C.

The primer of this invention has the advantage of replacing the isocyanates and methylene chloride components of conventional primers with less environmentally objectionable components while still providing excellent bond strengths in the final product, that is, in the adhered substrates.

DETAILED DESCRIPTION OF THE INVENTION

The ether type low molecular weight epoxy resin component of the primer of this invention has a molecular weight between 250 and 510. One useful epoxy resin is an epichlorohydrin/bisphenol A type low molecular weight epoxy resin. One such preferred low molecular weight epoxy resin is EPON resin 828 available from Shell Chemical Company, Cleveland, Ohio, a diglycidyl ether of bisphenol A. The EPON 828 Resin has a molecular weight of 350–400, an average molecular weight of 380, and an epoxide equivalent of 185–192 (ASTM D1652-59T). Among other useful low molecular weight epoxy resins are the diglycidyl ethers of other bisphenol compounds such as bisphenol B, F, G and H. A particularly preferred low molecular weight epoxy resin is that derived from epichlorohydrin and bisphenol F. Two useful low molecular weight bisphenol F epoxy resins are Araldite XU GY 281 and Araldite XU GY 308, both available from Ciba-Geigy Corporation Hawthorne, N.Y. Araldite XU GY 281 resin has an epoxy equivalent of 158–175 and Araldite XU GY 308 resin has an epoxide equivalent of 173–182.

Use of the epoxy resins based on bisphenol F provided primer solutions which were stable for more than thirteen weeks. These resins, because of their excellent solubility in organic solvents, dissolve readily in 1,1,1-trichloroethane without the use of a cosolvent.

The amino functional silane component of the primer of this invention is represented by the following structure:

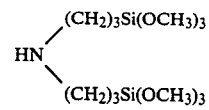

The preferred amino functional silane is available from Union Carbide, Danbury, Conn., as Y-9492 organofunctional silane (an amino alkyl trialkoxy disilane) and has a flash point over 200° F. as determined by ASTM D-93 using the Pensky-Markus closed cup.

Organofunctinal silanes useful in the primer of this invention include bis (gamma-trimethoxysilylpropyl) amine and gamma-aminopropyltrimethoxysilane.

The organic solvent component of the primer may be a halogenated hydrocarbon or nitroethane or a mixture of them. The halogenated hydrocarbons useful in the primer of this invention include trichlorotrifluoroethane, 1,1,1-trichloroethane, trichloroethylene and trichloromonofluoromethane. The preferred halogenated hydrocarbons are trichlorotrifluoroethane which is available as FREON TF Solvent from DuPont, Wilmington, Del. and 1,1,1-trichloroethane which is available as AEROTHENE TT from Dow Chemical Co., Midland, Mich.

A preferred embodiment of the primer of this invention combines from 2 to 5 parts by weight low molecular weight epoxy resin, from 2 to 4 parts by weight amino functional silane and from 75 to 80 parts by weight trichlorotrifluoroethane and from 6 to 21 parts nitroethane. Of course the total number of parts is 100 parts.

Another preferred embodiment of the primer of this invention combines from 2 to 5 parts by weight low molecular weight epoxy resin, from 2 to 4 parts by weight amino functional silane, and from 91 to 96 parts 1,1,1 trichloroethane.

The urethane based structural adhesive used with the primer treated reinforced plastic substrates was the PLIOGRIP 6600 urethane adhesive available from Ashland Chemical Company, Columbus, Ohio. This adhesive is prepared by mixing at a 4:1 ratio with the PLIOGRIP 6610 curative also available from Ashland Chemical Company.

The following examples are illustrative of the invention. All parts and percentages are by weight, and all temperatures are in degrees centigrade. All references mentioned herein are expressly incorporated by reference.

The following examples illustrate the preparation of the primers of this invention.

EXAMPLE 1

(190-125G)

Ether-type epoxy resin derived from epichlorohydrin and bisphenol A (Shell EPON 828) was first dissolved in nitroethane. The epoxy solution was then added to trichlorotrifluoroethane (DuPont Freon MF) followed by aminofunctional silane (Union Carbide Y-9492). A clear liquid of water thin viscosity and 1.396 specific gravity was obtained.

Table A presents the formulations prepared.

TABLE A

| Primer Formulations | | |
|---|---|---|
| | Example 1A (190-125G) | Example 1B (C4644-36) |
| EPON 838 epoxy resin | 5.0 g | 3.5 g |
| Y-9492 amino functional silane | 2.0 g | 3.15 g |
| nitroethane | 9.3 g | 12.7 g |
| FREON MF | 83.6 g | |
| FREON TF | | 82.9 g |
| Ceres Red Dye | | 0.051 |

The following example illustrates the use of the primer of Example 1.

EXAMPLE 2

(190-134)

Three inch by one inch pieces of fiberglass reinforced polyester (FRP) were treated by wiping on to one inch by one inch end portions of each piece the primer solution prepared according to Example 1. No other surface preparation was done. After the primer had dried for two minutes the commercially available PLIOGRIP 6600 adhesive (mixed 4:1 with the PLIOGRIP 6610 curative) was applied so that the final bond between two FRP pieces was 1"×1"×0.030". The adhered FRP pieces were post cured for 30 minutes at 150° C. Bond strengths were measured by lap shear adhesion tests at 0.5"/min. crosshead speed on the Instron test machine (ASTM method D1002). Different adhered FRP pieces were stored at various test conditions and the bond strengths were measured. The following Table B summarizes the test results for the primer formulation of Example 1A.

TABLE B (190-134 through 138)

| Storage Condition | Bond Strength - Nature of Failure |
|---|---|
| Room temperature bonds | 520 psi delamination of substrate |
| 82° C. bond line | 444 psi delamination of substrate |
| −40° C. bond line | 558 psi delamination of substrate |
| 7 day 54° C. H₂O Immersion | 320 psi delamination of substrate |
| 7 day 54° C. H₂O Immersion 24 hr. recovery | 308 psi delamination of substrate |
| 2 wks. 38° C./100% R.H. Test Immersion | 378 psi delamination of substrate |
| 2 wks. 38° C./100% R.H. 24 hr. recovery | 382 psi delaminaton of substrate |
| 2 wks. 71° C. 24 hr. recovery | 466 psi delamination of substrate |

Table C summarizes the test results for the primer formulation of Example 1B tested according to the procedure of Example 2. The control was the commercially available PLIOGRIP 6036 primer available from Ashland Chemical Company, Columbus, Ohio.

TABLE C (4644-43, 46, 58, 71, 95, 104)
Lap Shear Adhesion @ 82° C. psi (% DL)

| | Primer | |
|---|---|---|
| | Example 1B | Control |
| Primer Age | | |
| 1 Day | 510 (100%) | 400 (100%) |
| | 410 (100%) | 360 (98%) |
| | 490 (100%) | 380 (98%) |
| | 520 (100%) | 400 (95%) |
| 9 Day | 460 (100%) | 440 (10%) |
| | 430 (100%) | 470 (80%) |
| | 420 (100%) | 450 (100%) |
| | 420 (100%) | 500 (90%) |
| 3 Week | 420 (100%) | 430 (90%) |
| | 410 (95%) | 400 (40%) |
| | 380 (70%) | 450 (95%) |
| | 390 (100%) | 410 (100%) |
| | 410 (100%) | 420 (98%) |
| 5 Week, 2 Day | 380 (100%) | 410 (95%) |
| | 440 (100%) | 410 (100%) |
| | 450 (100%) | 390 (100%) |
| | 440 (100%) | 370 (100%) |
| | 450 (100%) | 450 (100%) |
| 10 Week | 420 (100%) | 410 (100%) |
| | 450 (100%) | 420 (98%) |
| | 420 (100%) | 360 (98%) |
| | 350 (100%) | 410 (100%) |
| | 440 (100%) | 440 (80%) |
| Appearance | | |
| After 10 Weeks | Precipitate on wall | Cloudy |
| After 13 Weeks | Lots of precipitate on wall | Cloudy |

EXAMPLE 3

(203-69,87)

The primer of Example 1A was compared with conventional primers for FRP substrates as follows. According to the procedure of Example 2 the commercially available PLIOGRIP 6036 primer (Ashland Chemical Company, Columbus, Ohio) was used in place of the primer of this invention. As in Example 2 the adhesive used was PLIOGRIP 6600 adhesive mixed in a 4:1 ratio with PLIOGRIP 6610 curative. Controls were done also where no primer of any kind was used. The results are reported in the following Table C.

TABLE C (203-69, 87)

| Storage Condition | Bond Strength - Nature of Failure |
|---|---|
| Commercial Primer | |
| Room Temperature | 426 psi delamination of substrate |
| 82° C. bond line | 402 psi delamination of substrate |
| Omit Primer | |
| Room Temperature | 298 psi |
| | 20% of samples showed some tear of fiber substrate |
| | 80% of samples showed adhesive failure |
| 82° C. Bond line | 266 psi |
| | All samples showed adhesive failure |

The results show that the best results, combining the high bond strengths and the substrate delamination which are both demanded in industry, are achieved using the primer of this invention.

The following example illustrates the use of epoxy resins based on bisphenol F in the primer of this invention.

EXAMPLE 4

(C4644-6, 10)

Epoxy resins derived from epichlorohydrin and bisphenol F in the amount of 2.5 grams [XUGY 281 or XUGY 308 epoxy resin] was dissolved in 46.0 grams 1,1,1-trichloroethane followed by the addition of 1.5 grams amino functional silane (Union Carbide Y-9492). A paper tissue was dipped into this primer solution and was used to wipe the surface of fiberglass reinforced polyester (FRP) substrate. As described in Example 2, polyurethane adhesive PLIOGRIP 6600 mixed 4:1 with PLIOGRIP 6610 curative was spread on the primed surface to make one inch wide lap shear samples. The adhered pieces were post cured for 30 minutes at 150° C. The samples were pulled on the Instron machine at 82° C. Delamination (DL) of the substrate was the criterion for satisfactory performance. Clean separation between the adhesive and the substrate was judged unsatisfactory or no good (NG). Table D summarizes the formulations, Table E the adhesion performance and Table F the hydrolysis resistance.

TABLE D

| Primer Formulations | | |
|---|---|---|
|  | Ex 4A | Ex 4B |
| XUGY 281 epoxy resin | 5.0 g. |  |
| XUGY 308 epoxy resin |  | 5.0 g. |
| Y-9492 | 3.0 g. | 3.0 g. |
| trichloroethane | 92.0 g. | 92.0 g. |

TABLE E (4644-43, 46, 58, 71, 95, 104)
Lap Shear Adhesion Performance @ 82° C., psi (% DL)

| | Primer | | |
|---|---|---|---|
| | Ex 4A | Ex 4B | Control |
| Primer Age | | | |
| 1 Day | 450 (98%) | 370 (95%) | 400 (100%) |
|  | 400 (100%) | 410 (98%) | 360 (98%) |
|  | 470 (95%) | 420 (98%) | 380 (98%) |
|  | 430 (100%) | 510 (95%) | 400 (95%) |
| 9 Day | 370 (98%) | 420 (90%) | 440 (10%) |
|  | 410 (100%) | 400 (100%) | 470 (80%) |
|  | 390 (100%) | 400 (100%) | 450 (100%) |
|  | 440 (100%) | 380 (85%) | 500 (90%) |
| 3 Week | 500 (100%) | 390 (NG) | 430 (90%) |
|  | 510 (100%) | 430 (NG) | 400 (40%) |
|  | 440 (95%) | 450 (100%) | 450 (95%) |
|  | 430 (75%) | 410 (100%) | 410 (100%) |
|  | 430 (80%) | 370 (NG) | 420 (98%) |
| 5 Week, 2 Day | 490 (40%) | 420 (85%) | 410 (95%) |
|  | 390 (100%) | 420 (95%) | 410 (100%) |
|  | 430 (98%) | 390 (100%) | 390 (100%) |
|  | 420 (NG) | 370 (98%) | 370 (100%) |
|  | 430 (60%) | 320 (NG) | 450 (100%) |
| 10 Week | 420 (98%) | 470 (100%) | 410 (100%) |
|  | 430 (99%) | 480 (100%) | 420 (98%) |
|  | 430 (100%) | 500 (100%) | 360 (98%) |
|  | 380 (100%) | 360 (100%) | 410 (100%) |
|  | 410 (100%) | 500 (100%) | 440 (80%) |
| 13 Week, 2 Day | 480 (85%) | 440 (70%) | 420 (98%) |
|  | 480 (98%) | 460 (98%) | 445 (100%) |
|  | 485 (98%) | 485 (98%) | 410 (75%) |
|  | 420 (40%) | 525 (100%) | 480 (60%) |
|  | 360 (80%) | 455 (98%) | 415 (98%) |
| Appearance | | | |
| After 10 weeks | Clear | Clear |  |
| After 13 weeks | Clear | Clear | Cloudy |

TABLE F

Hydrolysis Resistance of Primers
Adhesion After 8 Days in Water at 54° C. psi (% delamination)

| | Primer | | |
|---|---|---|---|
| Ex 4A | Ex 4B | Ex 1B | Control |
| 350 (100%) | 460 (100%) | 480 (100%) | 370 (100%) |
| 430 (100%) | 370 (100%) | 460 (100%) | 330 (100%) |
| 420 (100%) | 490 (98%) | 430 (100%) | 270 (100%) |
| 400 (95%) | 380 (98%) | 430 (100%) | 380 (90%) |

The primers of the invention were superior in performance to the control primer, the commercially available PLIOGRIP 6036 primer.

We claim:

1. The process of adhering a first fiberglass reinforced polyester substrate to a second substrate selected from the group consisting of fiberglass reinforced polyester, metal or plastic, comprising the steps of priming said first polyester substrate with a primer comprising an ether type epoxy resin, an amino functional silane and organic solvent, applying a curable urethane adhesive, affixing said second substrate, and curing said affixed substrates by heating to effect adherence therebetween.

2. The process of claim 1 wherein said primer comprises from 2 to 5 parts epichlorohydrin/bisphenol A type low molecular weight epoxy resin, from 2 to 4 parts aminofunctional silane, from 75 to 80 parts trichlorotrifluoroethane and the remainder nitroethane.

3. The process of claim 1 wherein said primer comprises from 3 to 7 parts epichlorohydrin/bisphenol F type low molecular weight epoxy resin, from 2 to 4 parts aminofunctional silane and the remainder trichloroethane.

4. The process of claim 1 wherein said amino functional silane is bis(gamma-trimethoxysilyl propyl) amine.

5. The process of claim 1 wherein said curing step is for 30 minutes at 150° C.

* * * * *